No. 648,882. Patented May 1, 1900.
L. A. RAGSDALE.
PRESS MOLD FOR GLASS.
(Application filed Jan. 14, 1899. Renewed Sept. 13, 1899.)

(No Model.) 3 Sheets—Sheet 1.

WITNESSES:
F. L. Ourand
W. P. Reindl

INVENTOR
Lewis A. Ragsdale.
BY
D. L. Reindl
ATTORNEY.

No. 648,882. Patented May 1, 1900.
L. A. RAGSDALE.
PRESS MOLD FOR GLASS.
(Application filed Jan. 14, 1899. Renewed Sept. 13, 1899.)

(No Model.) 3 Sheets—Sheet 2.

WITNESSES:
F. L. Ourand
W. Parker Reinohl

INVENTOR
Lewis A. Ragsdale,
BY
D. C. Reinohl
ATTORNEY.

UNITED STATES PATENT OFFICE.

LEWIS A. RAGSDALE, OF NEW YORK, N. Y.

PRESS-MOLD FOR GLASS.

SPECIFICATION forming part of Letters Patent No. 648,882, dated May 1, 1900.

Application filed January 14, 1899. Renewed September 13, 1899. Serial No. 730,472. (No model.)

*To all whom it may concern:*

Be it known that I, LEWIS A. RAGSDALE, a citizen of the United States, residing at New York city, in the State of New York, have invented certain new and useful Improvements in Press-Molds for Glass; and I do hereby declare the following to be a full, clear, and exact description of the invention, such as will enable others skilled in the art to which it appertains to make and use the same.

My invention relates to press-molds for glass, has especial reference to molds for making glass screw-threaded caps for jars and bottles, and has for its object the eradication of "crizzles" or their reduction to the minimum and the manufacture of perfect caps; and it consists in certain improvements in construction, which will be fully disclosed in the following specification and claims. In the manufacture of this class of articles a very large percentage of the caps produced by the present form of molds are defective in that they are "crizzled" or permeated with fine or incipient cracks, which admit air and frequently enlarge after being put into use. It has been my purpose to overcome this serious obstacle to the manufacture of screw-threaded glass caps, and the practical use of the mold which constitutes the subject-matter of this invention has demonstrated that it eliminates all objections and produces a perfect cap.

Figure 1:
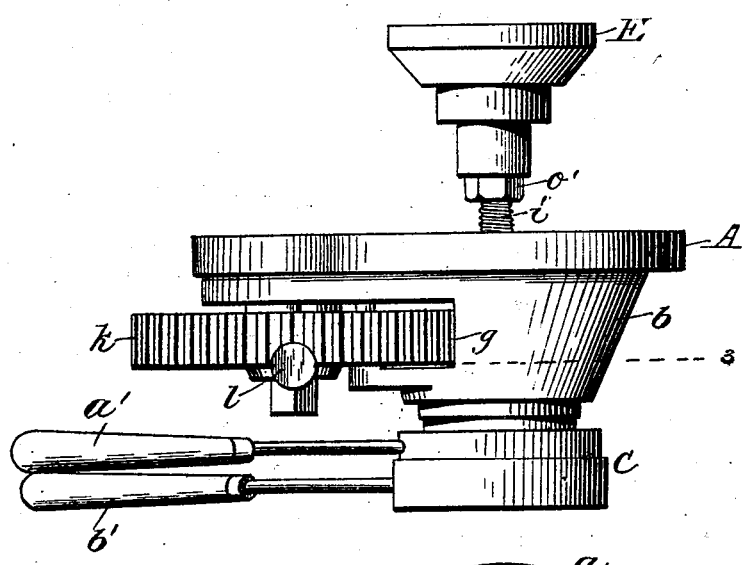
Figure 2:
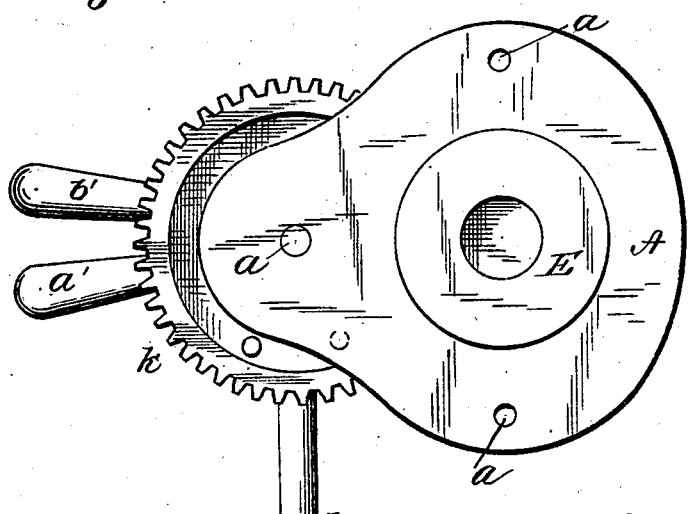
Figure 3:
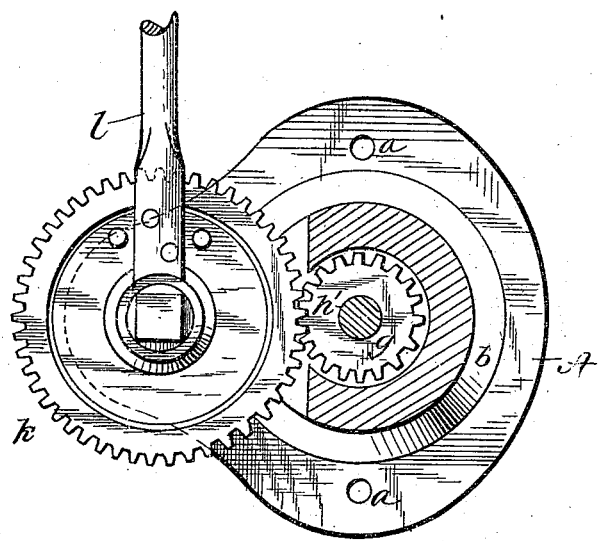
Figure 5:
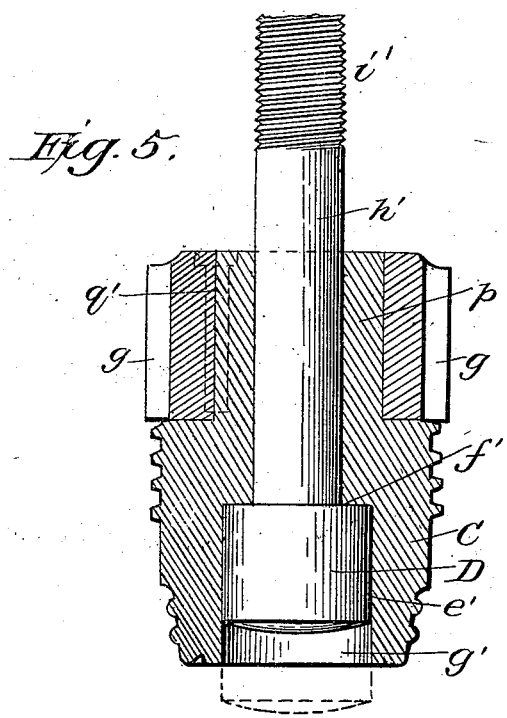
Figure 4:
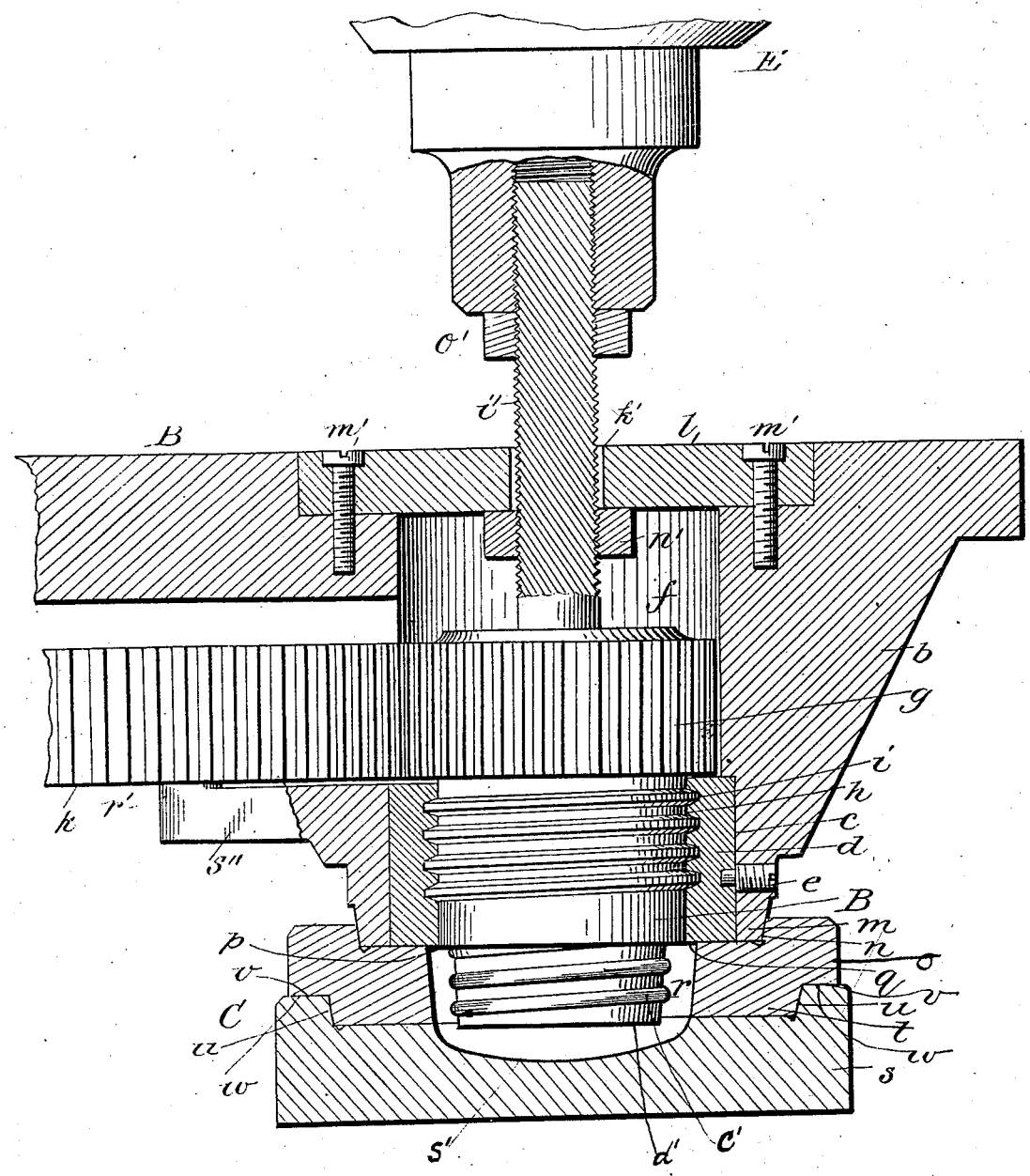

In the accompanying drawings, which form part of this specification, Figure 1 represents a side elevation of my improved mold; Fig. 2, a top plan view of the same; Fig. 3, an inverted horizontal plan on line 3, Fig. 1. Fig. 4 is a vertical section showing the parts on a greatly-enlarged scale, and Fig. 5 is a vertical section of the core and its plunger.

Reference being had to the drawings and the letters thereon, A indicates the base-plate, which is designed to be attached to the press-plate of any approved form of lever and spring operated press by bolts (not shown) passing through the holes $a\ a\ a$ in the base-plate. (Shown in Fig. 2.)

As the press forms no part of my present invention, it has not been deemed necessary to illustrate any part thereof.

Below the base-plate and preferably integral therewith is a casing or housing $b$, which contains the core, the plunger, and the pinions on the core. At the lower end of the casing is a concentric recess $c$, into which is fitted an annular steel bushing $d$, secured therein by set-screws $e$, only one of which is shown, or by any other well-known means for the purpose. The upper end of the bushing extends into the central opening $f$ in the casing and forms a support for the pinion $g$, which rests thereon, and the bushing is internally screw-threaded at $h$ to engage a corresponding screw-thread $i$ on the core B, by which the core is raised and lowered in the casing through the medium of the master gear-wheel $k$ and lever $l$, as is required in the operation of the mold.

The lower end of the casing is provided with a projection $m$, which fills the recess $n$ in the upper face of the upper or ring section $o$ of the horizontally-separable mold C and serves to guide and retain the core B in proper relation to the mold, while that part of the lower end of the bushing $d$ which engages the bottom of recess $n$ prevents the formation of a fin around the cap, the bearing-face of the cap being formed by the shoulder $p$ on the core and the overhanging part $q$ of the bushing $d$, as shown in Fig. 4. The upper section $o$ is also provided with a concentric opening $r$, which, with the cavity $s'$ in the lower or plate section $s$ of the mold, is of the contour of the exterior of the cap to be molded. The sections $o\ s$ are easily separable and are provided, respectively, with a projection $t$ and a recess $u$, a shoulder $v$ and a seat $w$, as shown in said figure, and each section has a handle $a'\ b'$, as shown in Figs. 1 and 2, by which the mold is placed in position and removed.

The lower end of the core B is provided with a screw-thread $c'$, which, with the body $d'$, is of the contour of the inner surface or interior of the cap. The core is hollow and contains a vertically-movable plunger D, which forms a very important part of my invention in preventing "crizzling" of the glass. The plunger operates in a chamber $e'$ in the lower end of the core, is of a length in excess of the length of the plunger, and when drawn up to its seat $f'$ forms a chamber $g'$ in the core below the plunger, as shown in Fig. 5, which becomes a receptacle for glass in the first stage of the operation of making glass screw-threaded caps. From the upper end of the plunger extends a rod $h'$, screw-threaded at $i'$ and passing through the opening $k'$ in the centering-plate $l'$, which may be secured thereto by screws $m'$, and on the screw-threaded part $i'$ is a nut $n'$, which is adjusted thereon to limit the upstroke of the plunger by coming in contact with the lower side of the centering-plate $l'$, and thereby regulates the capacity of the chamber $g'$ and the quantity of glass that can enter the chamber.

At the upper end of the rod $h'$ is a head E, designed to be secured to the plunger of the glass-press in any suitable manner, and the head is screwed on the rod by a jam-nut $o'$.

The pinion $g$ engages a neck $p'$ on the core B and is secured thereon by a cotter-pin $q'$, and the master-wheel $k$ engages a stud or pin $r'$ on the bracket $s''$ of the casing $b$.

The operation is as follows: The base-plate A and the head E having been secured to a glass-press in the manner described, glass in suitable bulk is dropped into the mold C. The press-plate is then drawn down by the press-lever, carrying with it the casing $b$ and its contained parts, the lever $l$ by being thrown to the right projecting the screw-threaded portion of the core into the cavity of the mold C, the plunger D being raised to the extent of its stroke in chamber $e'$ by the springs on the press, which permits the glass to flow into chamber $g'$ to prevent it flowing over the upper edge of the mold by displacement while the core is entering the mold. The core having entered the mold and the projection $m$ having been seated in the recess $n$, the plunger D is then pressed down by the continuous movement of the press-lever and the glass forced out of chamber $g'$ into the mold around the screw-threaded portion of the core and the cap formed. The core is then withdrawn from the mold by throwing the lever $l$ to the left; the plunger D remaining down. The operator then throws the press-lever up, and with its initial movement the springs of the press draw the plunger D into the recess $g'$. The further upward movement of the press-lever raises the casing $b$ and its parts above and free from the mold C. The lever $l$ is then thrown to the right to raise the core, when the off-bearer seizes the handles of the two sections of the mold and draws them from under the press and discharges the cap by raising the upper section $o$ from the section $s$ and inverting the former section, thus delivering the cap on its seat or open end. Should there be an excess of glass in the mold, it will form an increased thickness of the cap, which can do no harm.

The radical distinction between the operation of the present form of molds, in which the screw-thread on a plunger is revolved in the molten glass, and the present form, in which the core is projected into the mold with the glass below it and is subsequently displaced around the core by the plunger D, is that the former produces a very large percentage of defective caps, while the latter produces less than two per cent. of imperfect caps.

Having thus fully described my invention, what I claim is—

1. In a glass-mold, a receptacle for glass having the external contour of the article to be produced, in combination with a hollow core having the internal contour of said article, provided with an external screw-thread by means of which the core is lifted, a glass-displacing plunger within the core, and means for revolving the core.

2. In a glass-mold, a receptacle for glass having the external contour of the article to be produced and separable horizontally, in combination with a core having a coarse external screw-thread at its lower end, and an external screw-thread by which the core is lifted, a reciprocatory glass-displacing plunger within the core, and means for revolving the core.

3. In a glass-mold, a receptacle for glass having the external contour of the article to be produced, in combination with a hollow core having the internal contour of the article, provided with an external screw-thread by which the core is lifted, a reciprocatory plunger within and constructed to be drawn into the core forming a chamber for molten glass in the lower end of the core and to be projected beyond the end of the core to displace the glass and fill the mold, and means for revolving the core.

4. A mold having the external contour of the article to be produced, separable horizontally and the upper section having a recess in its upper face, in combination with a projection engaging said recess, a vertically-movable hollow core having the internal contour of the article, provided with an external screw-thread by which the core is lifted, a vertically-movable plunger in the core, and means for revolving the core.

5. A glass-mold, in combination with a vertically-movable hollow core, a vertically-movable plunger in the core, and an inclosing casing in which the core is supported.

6. A glass-mold, in combination with a vertically-movable hollow core, a casing having a base-plate, and a vertically-movable plunger in the core having a rod extending through the base-plate and provided with means for regulating the stroke of the plunger.

7. A glass-mold, in combination with a vertically-movable hollow core externally screw-threaded, a casing having a base-plate at one end and an internal screw-thread at the opposite end, and a vertically-movable plunger in the core having a screw-threaded rod extending through the base-plate and provided with a nut for regulating the stroke of the plunger.

8. A glass-mold, in combination with an externally-screw-threaded core, a vertically-movable plunger and an inclosing casing provided with a removable internally-screw-threaded bushing, a pinion on said core and a master gear-wheel.

In testimony whereof I affix my signature in presence of two witnesses.

LEWIS A. RAGSDALE.

Witnesses:
 JNO. C. HALCE,
 E. E. RAGSDALE.